United States Patent
Kukreja et al.

(10) Patent No.: US 9,733,983 B2
(45) Date of Patent: Aug. 15, 2017

(54) SYSTEM AND METHOD FOR SURGE PROTECTION AND RATE ACCELERATION IN A TRAFFIC DIRECTOR ENVIRONMENT

(75) Inventors: Basant Kukreja, Santa Clara, CA (US); Zhong Xu, San Jose, CA (US); Adam Leftik, Alamo, CA (US); Arvind Srinivasan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 509 days.

(21) Appl. No.: 13/601,428

(22) Filed: Aug. 31, 2012

(65) Prior Publication Data

US 2013/0080627 A1 Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.
*H04L 29/06* (2006.01)
*H04L 29/08* (2006.01)
(Continued)

(52) U.S. Cl.
CPC ............ *G06F 9/505* (2013.01); *G06F 9/4443* (2013.01); *G06F 9/45512* (2013.01);
(Continued)

(58) Field of Classification Search
CPC ............ H04L 67/1002; H04L 67/1008; H04L 67/1034; H04L 2029/06054; G06F 11/3433; G06F 2201/86
See application file for complete search history.

(56) References Cited

U.S. PATENT DOCUMENTS 6,560,717 B1 * 5/2003 Scott et al. .................... 714/4.1
6,691,244 B1 2/2004 Kampe et al.
(Continued)

FOREIGN PATENT DOCUMENTS

CN 1251669 A 4/2000
CN 1444813 9/2003
(Continued)

OTHER PUBLICATIONS

Gouthaman, et al., Oracle Traffic Director, Administrators Guide, 11g Release1, Aug. 2013, 312 pages, Oracle International Corporation.
(Continued)

*Primary Examiner* — Nicholas Taylor
*Assistant Examiner* — Ho Shiu
(74) *Attorney, Agent, or Firm* — Tucker Ellis LLP

(57) ABSTRACT

Described herein are systems and methods for use with a load balancer or traffic director, and administration thereof. In accordance with an embodiment the system comprises a traffic director having one or more traffic director instances, which is configured to receive and communicate requests, from clients, to origin servers having one or more pools of servers. A traffic monitor, at the traffic director, monitors traffic, including the number of connections, between the traffic director instances and one or more of the resource servers within the origin servers. The traffic director can set a traffic rate which controls the traffic, including the number of connections, to provide surge protection, or rate acceleration/deceleration.

20 Claims, 8 Drawing Sheets

(51) Int. Cl.
| | |
|---|---|
| *G06F 15/173* | (2006.01) |
| *G06F 15/177* | (2006.01) |
| *G06F 9/46* | (2006.01) |
| *G06F 9/50* | (2006.01) |
| *G06F 17/27* | (2006.01) |
| *G06F 9/44* | (2006.01) |
| *G06F 9/455* | (2006.01) |
| *G06F 11/20* | (2006.01) |
| *H04L 12/24* | (2006.01) |
| *G06F 11/34* | (2006.01) |

(52) U.S. Cl.
CPC ........ *G06F 11/2041* (2013.01); *G06F 17/276* (2013.01); *H04L 41/08* (2013.01); *H04L 63/0853* (2013.01); *H04L 67/1008* (2013.01); *G06F 11/3433* (2013.01); *G06F 2201/86* (2013.01); *H04L 67/1002* (2013.01); *H04L 67/1034* (2013.01); *H04L 2029/06054* (2013.01)

(56) References Cited

U.S. PATENT DOCUMENTS

| | | | |
|---|---|---|---|
| 6,701,438 B1 | 3/2004 | Prabandham | |
| 6,727,926 B1 | 4/2004 | Utsuki | |
| 6,880,156 B1* | 4/2005 | Landherr et al. | 718/105 |
| 7,099,915 B1* | 8/2006 | Tenereillo et al. | 709/203 |
| 7,158,926 B2 | 1/2007 | Kampe | |
| 7,289,445 B2 | 10/2007 | Illikkal | |
| 7,321,926 B1* | 1/2008 | Zhang et al. | 709/220 |
| 7,370,083 B2 | 5/2008 | Husain et al. | |
| 7,395,355 B2 | 7/2008 | Afergan | |
| 7,437,549 B2 | 10/2008 | Lindqvist | |
| 7,616,625 B1 | 11/2009 | Un | |
| 7,619,545 B2 | 11/2009 | Samuels | |
| 7,664,948 B2 | 2/2010 | Moreau | |
| 7,849,368 B2 | 12/2010 | Srivastava | |
| 8,059,653 B1* | 11/2011 | Wang et al. | 370/392 |
| 8,230,336 B2 | 7/2012 | Morrill | |
| 8,260,757 B1* | 9/2012 | Chatterjee et al. | 707/703 |
| 8,693,981 B1* | 4/2014 | Anugu | 455/405 |
| 2001/0049732 A1 | 12/2001 | Raciborski | |
| 2001/0049741 A1* | 12/2001 | Skene | G06F 9/505 709/232 |
| 2002/0055980 A1* | 5/2002 | Goddard | H04L 29/06 709/217 |
| 2002/0055982 A1* | 5/2002 | Goddard | H04L 29/06 709/217 |
| 2002/0087694 A1 | 7/2002 | Daoud | |
| 2002/0116397 A1* | 8/2002 | Berg | H04L 29/06 |
| 2002/0122388 A1 | 9/2002 | Behbehani | |
| 2002/0143953 A1* | 10/2002 | Aiken, Jr. | 709/227 |
| 2002/0143965 A1* | 10/2002 | Aiken, Jr. | 709/229 |
| 2002/0152307 A1 | 10/2002 | Doyle et al. | |
| 2003/0023743 A1* | 1/2003 | Raphel et al. | 709/232 |
| 2003/0051055 A1 | 3/2003 | Parrella et al. | |
| 2003/0188013 A1* | 10/2003 | Nishikado | H04L 67/42 709/238 |
| 2003/0195940 A1 | 10/2003 | Basu | |
| 2004/0024853 A1* | 2/2004 | Cates et al. | 709/223 |
| 2004/0024861 A1* | 2/2004 | Coughlin | 709/224 |
| 2004/0031030 A1 | 2/2004 | Kidder | |
| 2004/0049598 A1 | 3/2004 | Tucker | |
| 2004/0107273 A1 | 6/2004 | Biran | |
| 2004/0172470 A1 | 9/2004 | Shiina | |
| 2005/0086337 A1 | 4/2005 | Quittek | |
| 2005/0102400 A1* | 5/2005 | Nakahara et al. | 709/225 |
| 2005/0188295 A1 | 8/2005 | Konkus et al. | |
| 2005/0198247 A1 | 9/2005 | Perry | |
| 2005/0213507 A1* | 9/2005 | Banerjee | H04L 41/0806 370/241 |
| 2005/0262183 A1 | 11/2005 | Colrain et al. | |
| 2006/0062177 A1 | 3/2006 | Asthana | |
| 2006/0085680 A1 | 4/2006 | Matsuno | |
| 2006/0190579 A1 | 8/2006 | Rachniowski et al. | |
| 2006/0294207 A1* | 12/2006 | Barsness et al. | 709/220 |
| 2007/0005801 A1 | 1/2007 | Kumar et al. | |
| 2007/0130341 A1* | 6/2007 | Ma | 709/226 |
| 2007/0169049 A1 | 7/2007 | Gingell et al. | |
| 2007/0174660 A1 | 7/2007 | Peddada | |
| 2007/0226359 A1 | 9/2007 | Gunduc et al. | |
| 2007/0260702 A1 | 11/2007 | Richardson | |
| 2007/0288604 A1* | 12/2007 | Achtermann | H04L 67/06 709/220 |
| 2008/0046596 A1 | 2/2008 | Afergan | |
| 2008/0133536 A1 | 6/2008 | Bjorner et al. | |
| 2008/0228939 A1 | 9/2008 | Samuels | |
| 2009/0006541 A1* | 1/2009 | Baba et al. | 709/203 |
| 2009/0049161 A1 | 2/2009 | Takeuchi | |
| 2009/0077233 A1* | 3/2009 | Kurebayashi et al. | 709/224 |
| 2009/0204885 A1 | 8/2009 | Ellsworth et al. | |
| 2009/0245122 A1 | 10/2009 | Maiocco | |
| 2009/0259736 A1* | 10/2009 | Chang et al. | 709/221 |
| 2009/0328054 A1 | 12/2009 | Paramasivam et al. | |
| 2010/0030851 A1* | 2/2010 | Inden et al. | 709/203 |
| 2010/0036956 A1* | 2/2010 | Nishikawa | 709/226 |
| 2010/0070561 A1 | 3/2010 | Dhoolia et al. | |
| 2010/0220740 A1 | 9/2010 | Hufferd | |
| 2010/0235484 A1 | 9/2010 | Bolan et al. | |
| 2011/0106949 A1* | 5/2011 | Patel et al. | 709/226 |
| 2011/0107136 A1 | 5/2011 | Jonnagadla et al. | |
| 2011/0122893 A1 | 5/2011 | Kang | |
| 2011/0145786 A1 | 6/2011 | Fayed et al. | |
| 2011/0161523 A1 | 6/2011 | Erickson | |
| 2011/0208808 A1 | 8/2011 | Corbett | |
| 2011/0276695 A1* | 11/2011 | Maldaner | 709/226 |
| 2012/0096166 A1 | 4/2012 | Devarapalli | |
| 2012/0271964 A1 | 10/2012 | Porter | |
| 2013/0054806 A1 | 2/2013 | Francis | |
| 2014/0089285 A1 | 3/2014 | Gibbs | |

FOREIGN PATENT DOCUMENTS

| | | |
|---|---|---|
| CN | 1285055 C | 11/2006 |
| CN | 101291253 | 10/2008 |
| CN | 101346972 A | 1/2009 |
| CN | 101755418 | 6/2010 |
| CN | 102077533 | 5/2011 |
| EP | 1134658 A2 | 9/2001 |
| GB | 2 360 369 A | 9/2001 |
| JP | S62139049 A | 6/1987 |
| JP | H09259095 A | 10/1997 |
| JP | H09330245 A | 12/1997 |
| JP | 2000099435 A | 4/2000 |
| JP | 2002163241 | 6/2002 |
| JP | 2004030204 | 1/2004 |
| JP | 2008027388 | 2/2008 |
| JP | 2008040718 | 2/2008 |
| JP | 2009193427 | 8/2009 |
| JP | 2010113495 | 5/2010 |
| JP | 2011186810 | 9/2011 |
| WO | 02/07037 | 1/2002 |
| WO | 03/105004 | 12/2003 |
| WO | 2004/008334 | 1/2004 |

OTHER PUBLICATIONS

Unknown Author, Health Checks Overview, Chapter 4, Health Checks, Jun. 2009, 4-1-4-76, Brocade Communication Systems.
International Searching Authority, International Search Report and Written Opinion for PCT International Application No. PCT/US2012/057373, Feb. 14, 2013, 13 pages.
International Searching Authority, International Search Report and Written Opinion for PCT International Application No. PCT/US2012/057370, May 31, 2013, 17 pages.
International Searching Authority, International Search Report and Written Opinion for PCT International Application No. PCT/US2012/057375, May 24, 2013, 19 pages.
International Searching Authority, International Search Report and Written Opinion for PCT International Application No. PCT/US2012/057620, Jun. 5, 2013, 22 pages.

(56) References Cited

OTHER PUBLICATIONS

Wikipedia, HTTP Compression, pp. 1-2, http://en.wikipedia.org/w/index.php?title=HTTP_compression&oldid=450858133, Sep. 16, 2011.

Method and System for Displaying Graphical Objects in a Command Line Interface (CLI) Terminal, IP.COM Journal, IP.COM Inc., West Henrietta, NY, US, Feb. 18, 2010.

Elkstein, DR. M., 14.3 How Do I Handle Authentication in Rest?, Aug. 26, 2011, http://web.archive.org/web/20110826023142/http://rest.elkstein.org/2008/01/how-do-i-handle-authentication-in-rest.html, retrieved Apr. 24, 2013.

State Intellectual Property Office of the People's Republic of China, Notification of First Office Action Dated Jun. 23, 2016 for Chinese Patent Application No. 201280047076.9, 14 Pages.

State Intellectual Property Office of the People's Republic of China, Notification of First Office Action Dated Jun. 30, 2016 for Chinese Patent Application No. 201280047079.2, 10 Pages.

State Intellectual Property Office of the People's Republic of China, Notification of First Office Action Dated Aug. 4, 2016 for Chinese Patent Application No. 201280047077.3, 12 Pages.

United States Patent and Trademark Office, Office Action Dated May 25, 2016 for U.S. Appl. No. 13/625,716, 13 Pages.

Ken St. Cyr, "Load-Balance Ad LDS Wtih Microsoft NLB in 6 Steps" Jun. 23, 2009, Windows IP PRO, 9 Pages, Retrieved May 25, 2016 From: <http://windowsitpro.com/article/network-load-balancing-nlb/load-balance-ad-lds-with-microsoft-nlb-in-6-steps-102360>.

\* cited by examiner

SYSTEM AND METHOD FOR SURGE PROTECTION AND RATE ACCELERATION IN A TRAFFIC DIRECTOR ENVIRONMENT

CLAIM OF PRIORITY

This application claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to a load balancer or traffic director, for use in an application server, middleware machine or other computing environment, and is particularly related to a system and method for surge protection and rate acceleration in a traffic director environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment the system comprises a traffic director having one or more traffic director instances, which is configured to receive and communicate requests, from clients, to origin servers having one or more pools of servers. A traffic monitor, at the traffic director, monitors traffic, including the number of connections, between the traffic director instances and one or more of the resource servers within the origin servers. The traffic director can set a traffic rate which controls the traffic, including the number of connections, to provide surge protection, or rate acceleration/deceleration.

DETAILED DESCRIPTION

Figure 1:
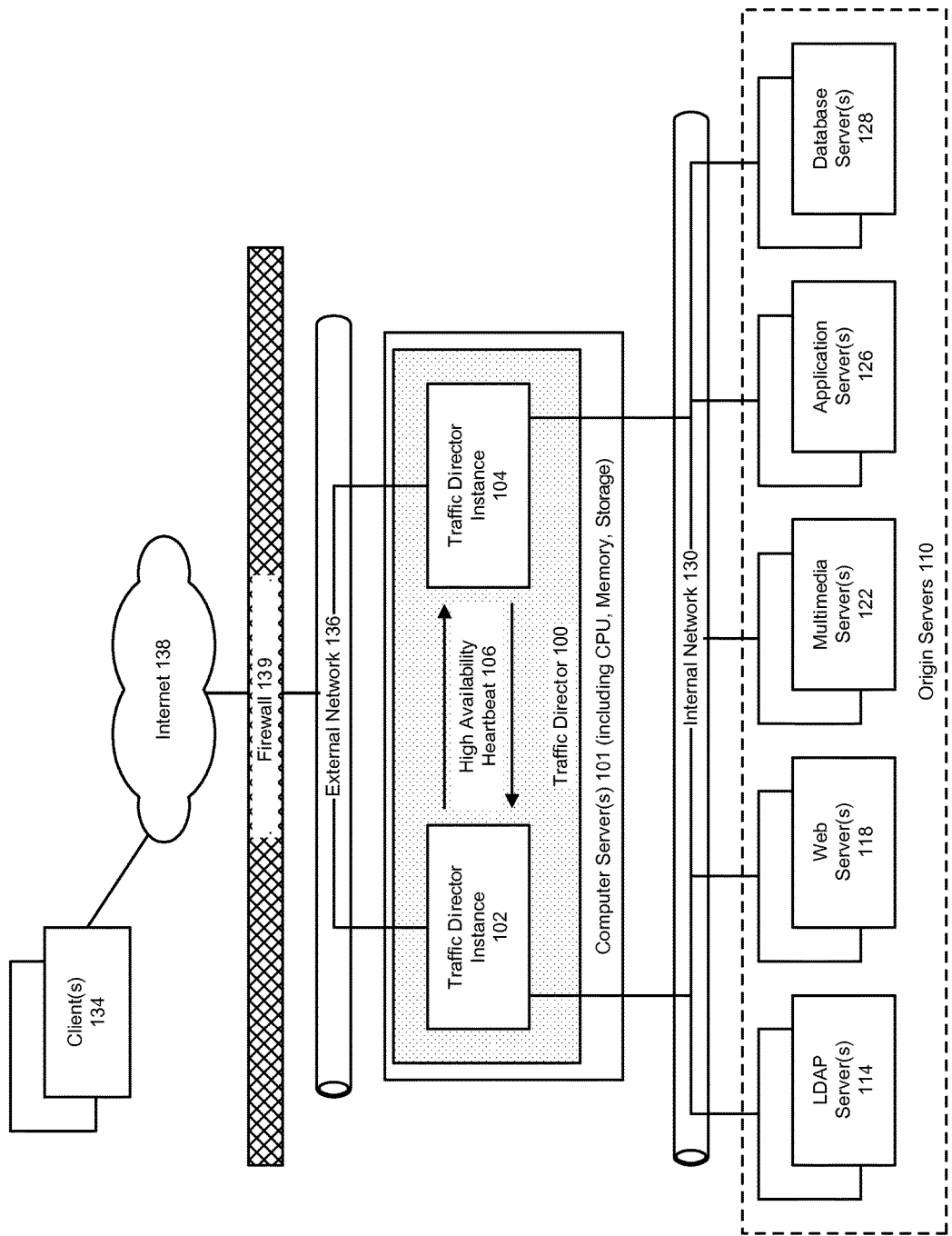
FIG. 1 illustrates a computing environment which includes a load balancer or traffic director, in accordance with an embodiment.

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies.

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

In accordance with an embodiment, the traffic director can perform tasks such as distributing requests to origin servers based on one or more load-balancing methods; routing requests based on specified rules; caching frequently accessed data; prioritize traffic; and controlling the quality of service.

From a performance perspective, in accordance with an embodiment, the traffic director can include an architecture that enables it to handle large volumes of traffic with low latency. For example, embodiments can be optimized for use within a high-performance computing environment such as, e.g., Oracle Exalogic Elastic Cloud, or to communicate with origin servers at the back-end using a high performance communication fabric such as, e.g., InfiniBand. In accordance with an embodiment, to support high availability, the traffic director can recognize failover groups of traffic director instances that provide active-passive or active-active failover. As the volume of traffic to a network increases, the traffic director environment can be scaled by reconfiguring the traffic director with additional back-end servers to which it can route requests, or by modifying the rate at which traffic is communicated.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs. For example, a simple traffic director topology might initially utilize a single traffic director instance running on a dedicated compute node and distributing client requests to a pool of servers at the back-end. To avoid a single point of failure, an administrator can configure two homogenous traffic director instances running on different nodes and forming an active-passive failover pair. To improve resource utilization, an administrator can configure the two traffic director instances in active-active mode with two virtual IP addresses.

Glossary

In accordance with an embodiment, the following terms are used herein. It will be evident that, in accordance with other embodiments, additional and/or different terms can be used.

Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP). In accordance with an embodiment, a failover group provides high availability in active-passive mode; wherein requests are received at the VIP and routed to the instance that is designated as the primary instance; if the primary instance is not reachable, requests are routed to the backup instance. In accordance with an embodiment, for active-active failover, two failover groups are required, each with a unique VIP, but both comprising the same nodes with the primary and backup roles reversed; each instance in the failover group is designated as the primary instance for one VIP, and the backup for the other VIP.

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

FIG. 1 illustrates a computing environment which includes a load balancer or traffic director, in accordance with an embodiment. As shown in FIG. 1, in accordance with an embodiment, the traffic director 100 (referred to herein in some embodiments as Oracle Traffic Director (OTD)) can be deployed on one or more physical computer servers 101 (or similar computing devices that include a processor (CPU), memory, and storage), and can include one or more traffic director instances 102, 104, which in turn can communicate with one another using a high-availability heartbeat or similar means 106.

For any particular organization, depending on their business requirements, such as the number of back-end applications for which they want to use the traffic director to balance requests, their internal requirements such as security, and the traffic director features they wish to use, the traffic director topology can be varied to address their needs. The back-end can include one or more origin servers 110, examples of which can include LDAP servers 114, web servers 118, multimedia servers 122, application servers 126, and database servers 128. In accordance with an embodiment, the application server can be a WebLogic server (WLS). Other types of origin servers, and application servers, can be used, depending on the particular needs of the organization. Each of the origin servers can communicate with one another, and with the traffic director, via an internal network 130 such as an Ethernet network.

In accordance with an embodiment, the traffic director can receive requests from clients 134, via an external network 136, the Internet 138, and in the case of many organizations a firewall 139. Examples of the types of clients that can be used with the system include computer servers, laptop computers, portable devices such as smartphones, and other types of computing devices, some of which may include, e.g., a web browser application for accessing a web server.

Figure 2:
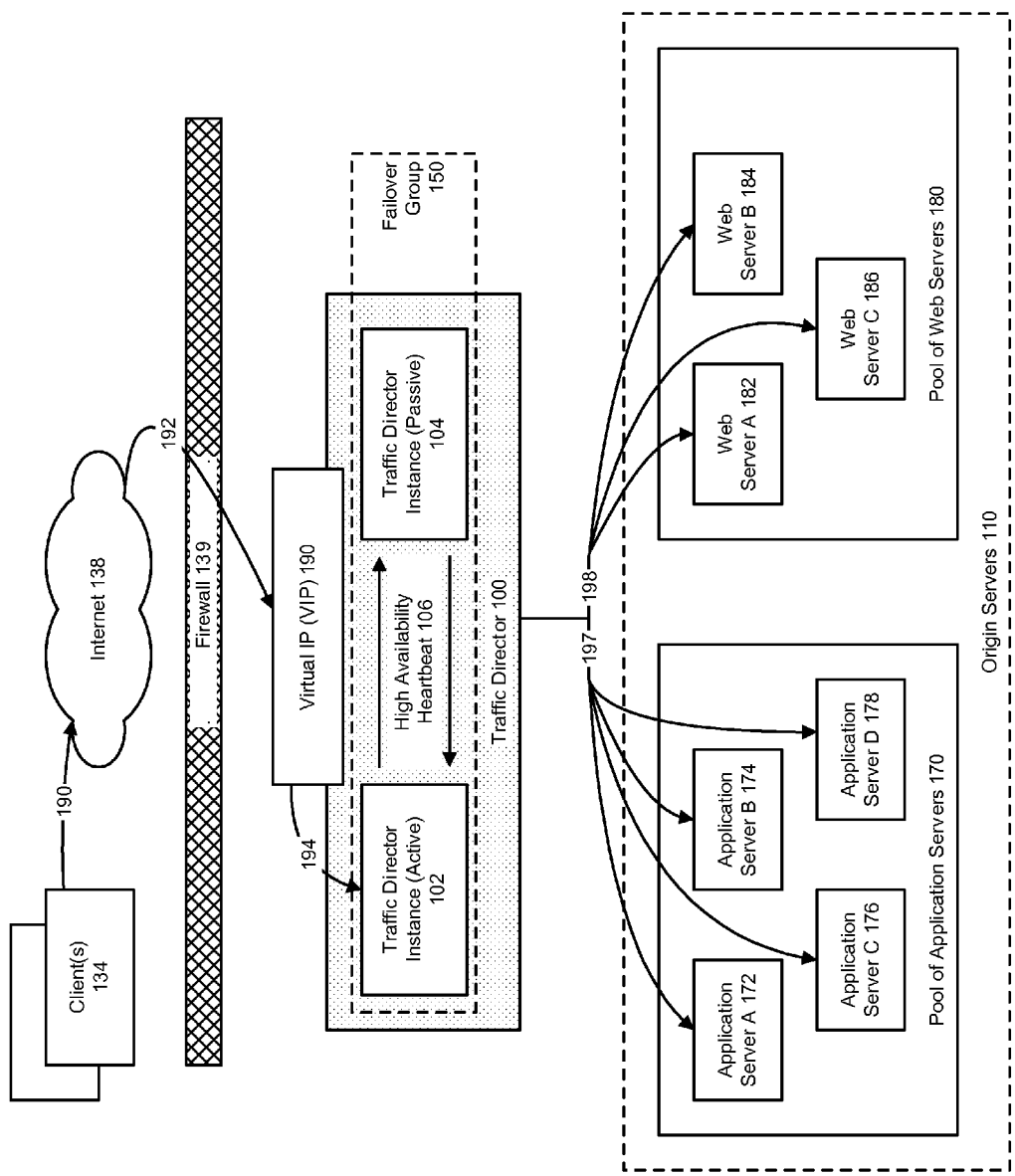
FIG. 2 illustrates the use of a traffic director with one or more pools or origin servers, in accordance with an embodiment.

FIG. 2 illustrates the use of a traffic director with one or more pools or origin servers, in accordance with an embodiment. In the example illustrated in FIG. 2, the traffic director is used with two pools, including a (first) pool of application servers 170, having four application servers, here indicated as A 172, B 174, C 176, D 178; and a (second) pool of web servers 180, having three web servers, here indicated as A 182, B 184, C 186. In accordance with other embodiments and examples, other types and numbers of pools and servers can be used, depending on the particular needs of the organization.

In the example illustrated in FIG. 2, the topology comprises two traffic director instances (102 and 104) forming an active-passive failover group 150, and including a single virtual IP address 190 for receipt of client requests. When the active instance (in this example instance 102) receives a request 190, 192, 194, it determines the server pool to which the request should be sent, and forwards the request 197, 198 to one of the servers in that pool, based on the load-distribution method(s) that are specified for that pool.

Although the example shown in FIG. 2 illustrates the use of two server pools at the back-end, an administrator can configure the traffic director to route requests to servers in multiple pools. In the active-passive setup illustrated in FIG. 2, one node in the failover group is redundant at any point in time. In accordance with an embodiment, to improve resource utilization, the administrator can configure the two traffic director instances in active-active mode with two virtual IP addresses; in this scenario each instance caters to requests received on one virtual IP address, and backs up the other instance.

Figure 3:
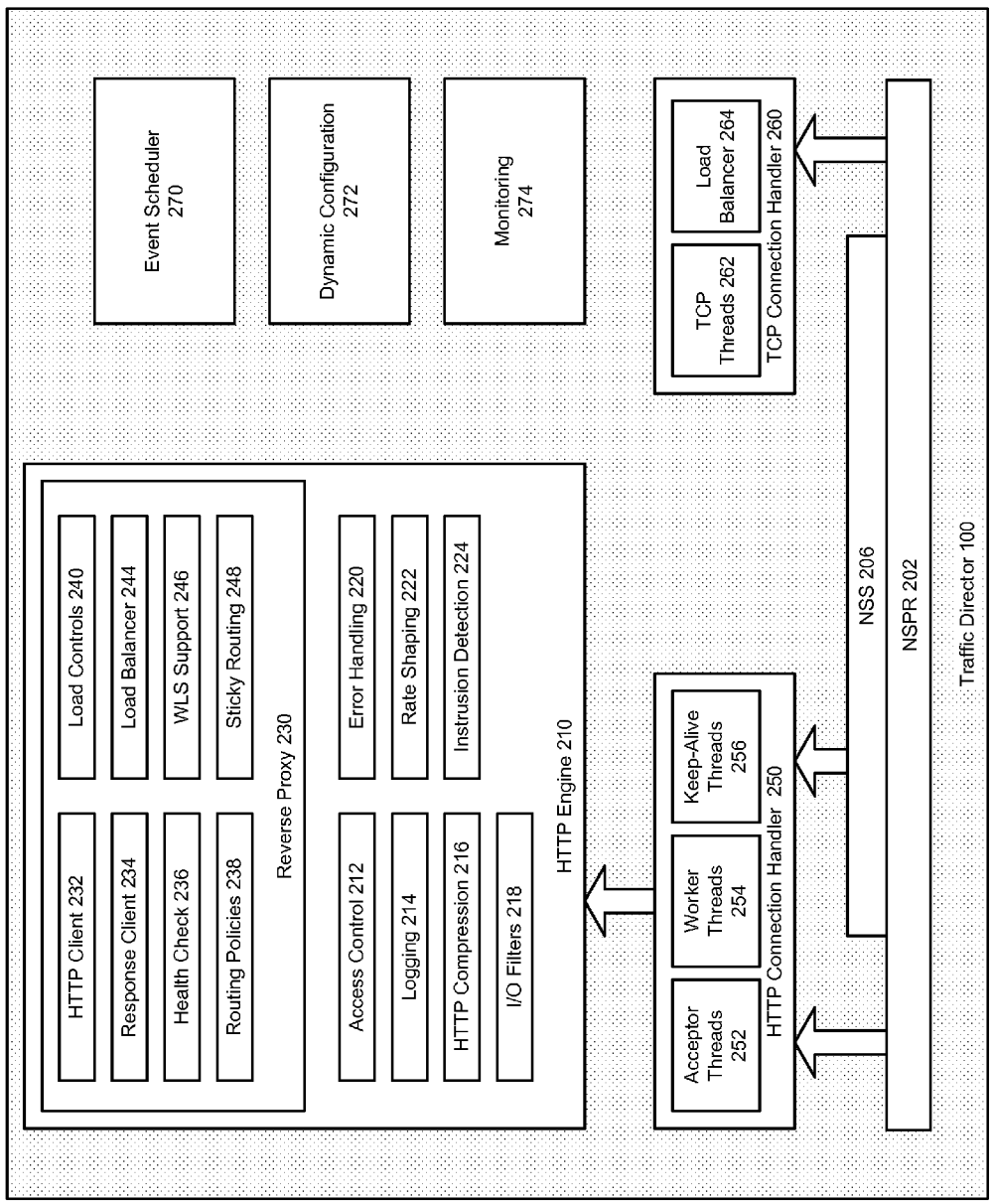
FIG. 3 illustrates a traffic director architecture, in accordance with an embodiment.

FIG. 3 illustrates a traffic director architecture, in accordance with an embodiment. In accordance with an embodiment, the traffic director can include an architecture that enables it to handle large volumes of traffic with low latency. Embodiments can also be optimized for use within a high-performance computing environment, or to communicate with origin servers at the back-end using a high performance communication fabric.

As shown in FIG. 3, in accordance with an embodiment, the traffic director can include one or more Netscape portable runtime (NSPR) 202 and Network Security Services (NSS) 206 layers. In accordance with an embodiment, the traffic director can also include an HTTP engine 210 having one or more access control 212, logging 214, HTTP compression 216, I/O filter 218, error handling 220, rate shaping 222, intrusion detection 224, or other components; and a reverse proxy component 230 having one or more http client 232, response client 234, health check 236, routing policies 238, load controls 240, load balancer 244, WLS support 246, sticky routing 248, or other components. In accordance with an embodiment, the traffic director can also include an HTTP connection handler 250 having one or more acceptor threads 252, worker threads 254, keep-alive threads 256, or other components. In accordance with an embodiment, the traffic director can also include a TCP connection handler 260 having one or more TCP threads 262, load balancer 264, or other components. In accordance with an embodiment, the traffic director can also include one or more evens schedule 270, dynamic configuration 272, monitoring 274, or other components.

It will be evident that, in accordance with other embodiments, additional and/or different components can be used.

Figure 4:
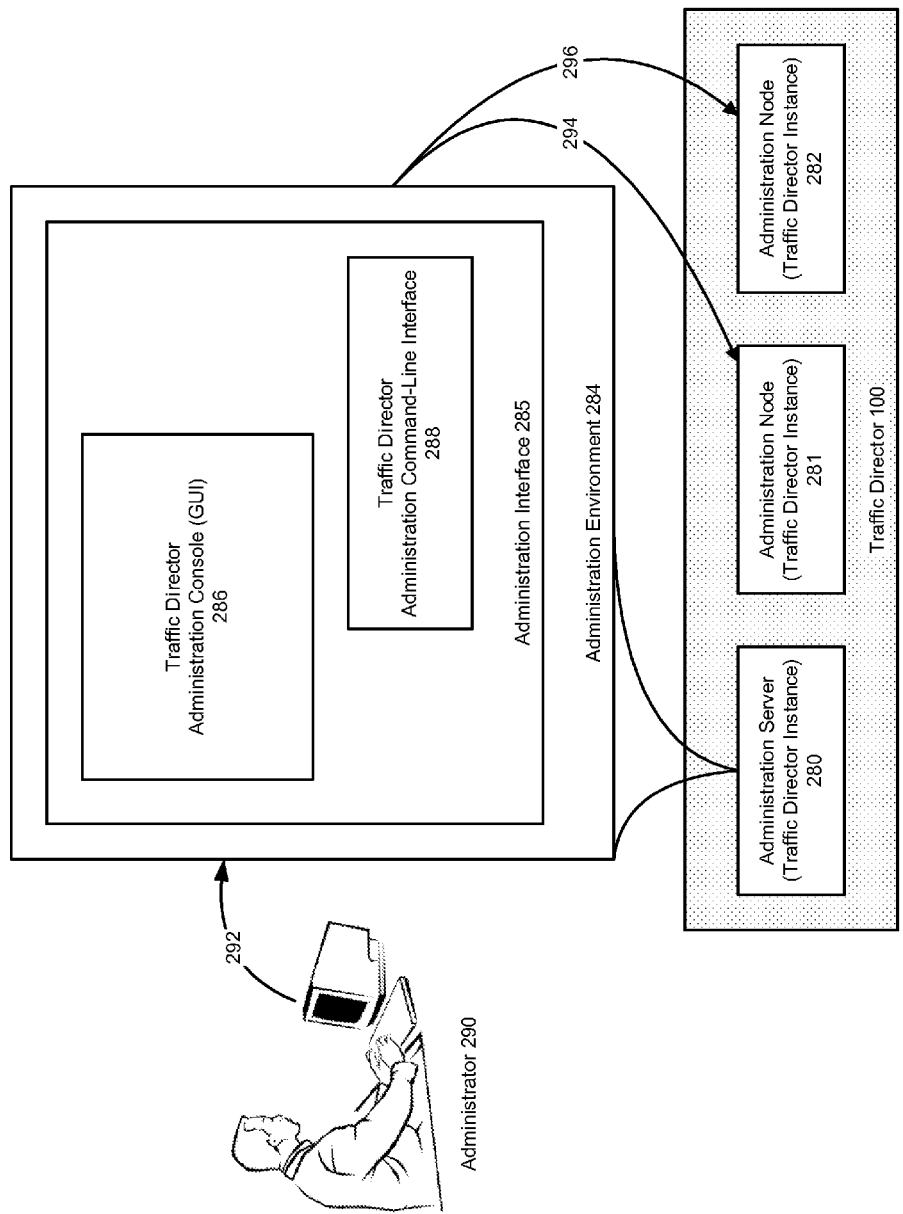
FIG. 4 illustrates a traffic director administration environment and interface, in accordance with an embodiment.

FIG. 4 illustrates a traffic director administration environment and interface, in accordance with an embodiment. From an administration perspective, the traffic director is designed to be easy to install, configure, and use; and can include a simple, wizard-driven graphical interface, as well as a robust command-line interface, for use by an administrator in managing traffic director instances. As shown in FIG. 4, in accordance with an embodiment, the traffic director can include one or more traffic director instances 280, 281, 282, wherein at least one of the instances is designated an administration server (280), while other instances are designated as administration nodes (281, 282).

In accordance with an embodiment, an administration environment 284 includes an administration interface 285, which in turn includes one or more of an administration console (GUI) 286 and/or a command line interface 288, that enables an administrator 290 to configure or otherwise administer 292 the traffic director, or its instances 294, 296.

Surge Protection

Load balancers can help prevent server outages that would be otherwise caused by an unanticipated surge of traffic to, e.g., an origin server. In accordance with an embodiment, the traffic director provides an intelligent form of surge protection, by monitoring traffic to the origin servers and queuing connections as necessary, so that the traffic does not exceed certain surge limits.

In accordance with an embodiment, when surge protection is enabled, the traffic director will not open more concurrent connections to a server than a configured capacity. This limit or maximum capacity can be specified by an element <max-connections>. If an origin server reaches its maximum connection capacity, then no requests requiring new connections will be routed to this server until some of its existing connections have been released. If all origin servers have reached their connection capacities, then subsequent requests that need new connections will be rejected, and error messages sent.

Figure 5:
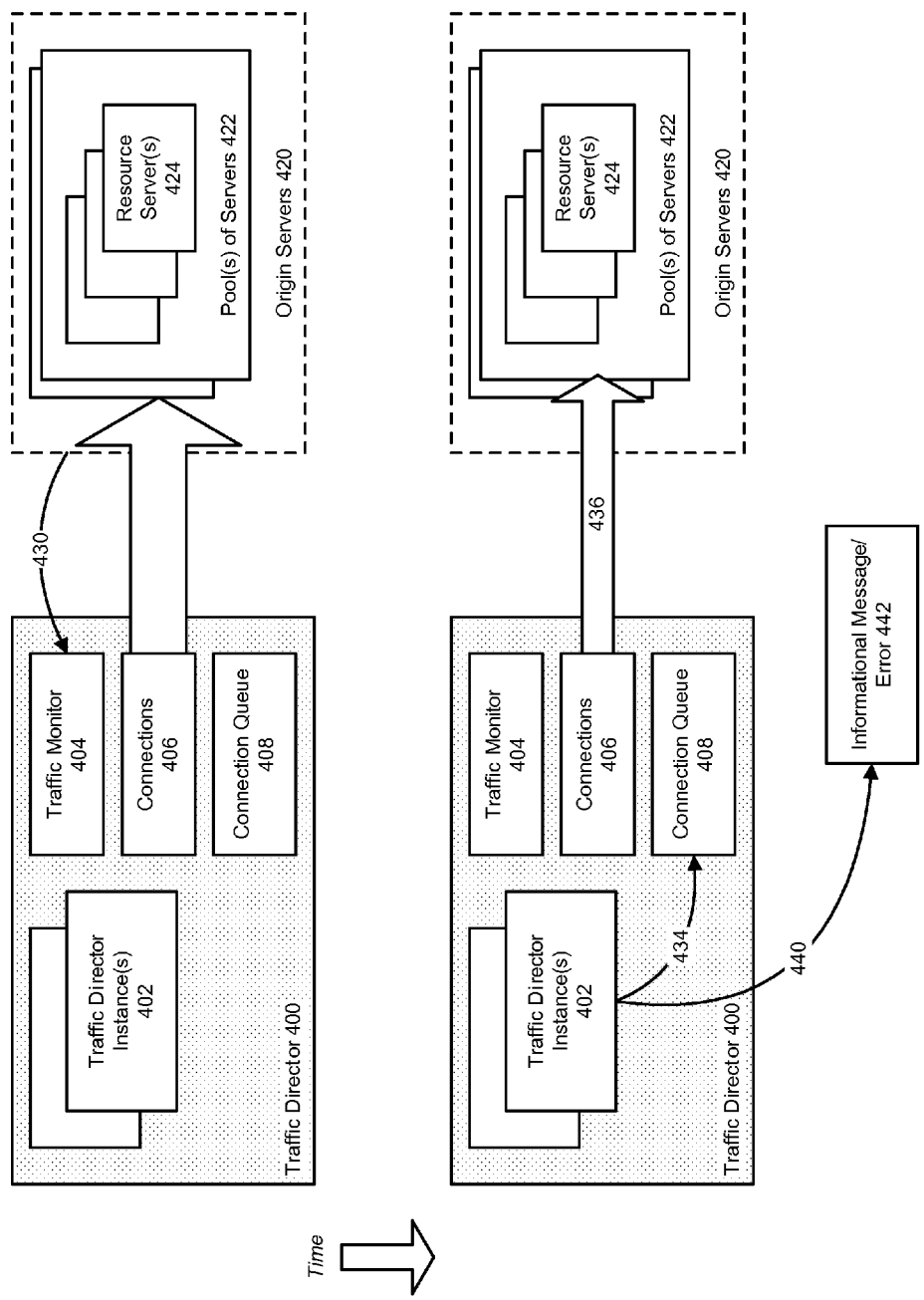
FIG. 5 illustrates the use of surge protection in a traffic director, in accordance with an embodiment.

FIG. 5 illustrates the use of surge protection in a traffic director, in accordance with an embodiment. As shown in FIG. 5, a traffic director environment is provided, including a traffic director 400 having one or more traffic director instances 402, and origin servers 420 having one or more pools of servers 422. Each pool of servers can include one or more resource servers 424.

In accordance with an embodiment, the traffic director includes a traffic monitor 404, which enables the traffic director to monitor traffic, including the number of connections 406, between the traffic director instances and one or more of the resource servers within the origin servers. In accordance with an embodiment, the traffic director also includes a connection queue 408, which can be used to queue connections.

During operation, while requests from clients are being communicated to the origin servers, the traffic monitor receives feedback 430 describing traffic, including the number of connections between the traffic director and the resource servers. If the traffic monitor determines that the traffic, including the number of connections, between the traffic director and a particular resource server exceeds a maximum amount allowed for that resource server, then the traffic director can temporarily direct subsequent traffic and connections away from the resource server and to the connection queue 434, which has the effect of temporarily reducing or limiting 436 the amount of traffic flowing to that resource server.

In accordance with an embodiment, the traffic director can optionally provide 440 an informational message 442, e.g., to a log file or to an administrator, to inform them of the traffic surge, and the action taken. The traffic monitor can continue to monitor traffic/connections to the origin servers, for subsequent adjustment to the connection queue as necessary.

Rate Shaping (Acceleration/Deceleration)

In accordance with an embodiment, the traffic director also supports request rate acceleration, which allows graceful addition of a server to origin server pools, by gradually accelerating traffic to newly added servers, as opposed to overwhelming those servers with a massive amount of traffic. Request rate acceleration is adaptive, inasmuch as it can incorporate a number of dynamically monitored parameters, such as number of active connections or current load, maximum number of connections or the capacity of the origin servers. The feature can also be extended to provide request-rate deceleration, whereby the traffic director can effectively ramp down traffic directed at an origin server, so that an administrator can take it offline when its traffic is completely quiesced, e.g., for scheduled maintenance purposes. Together, both rate acceleration and deceleration can be used to shape the rate of traffic to the origin servers.

In accordance with an embodiment, when an origin server comes online, the traffic director will not send requests to the server at its full capacity immediately, but will instead gradually increase the sending rate over a period of time. This can provide several benefits: for example, when an origin server is starting up, it will need a certain period of time to load data and allocate various resources; during this warm-up process, the origin server's response time may be slow, and sending a large number of requests to the server will make the server performance even worse and may cause unexpected behaviors of the server. Additionally, if an origin server is problematic, it may fail in responding to some or most of the requests, and its status may change frequently between "UP" and "DOWN" status; for such a server, it is better not to send many requests to it at the beginning of its "UP" status. Furthermore, if a load balancing algorithm such as least connection count is used, the traffic director may send many requests to a new server and may flood the server at beginning time, because a new server's connection count would be zero; rate accelerating can alleviate this problem.

In accordance with an embodiment, the traffic director will gradually increase the traffic rate to a new server until the rate reaches the server's configured maximum rate (max-connections). Rate accelerating can be achieved via connection capacity adjustment, and the adjustment of capacity can be either time based (i.e., increasing the connection capacity by a fixed value per unit time.) or window-based (i.e., increasing the connection capacity by a value after it receives a certain number of responses.

Figure 6:
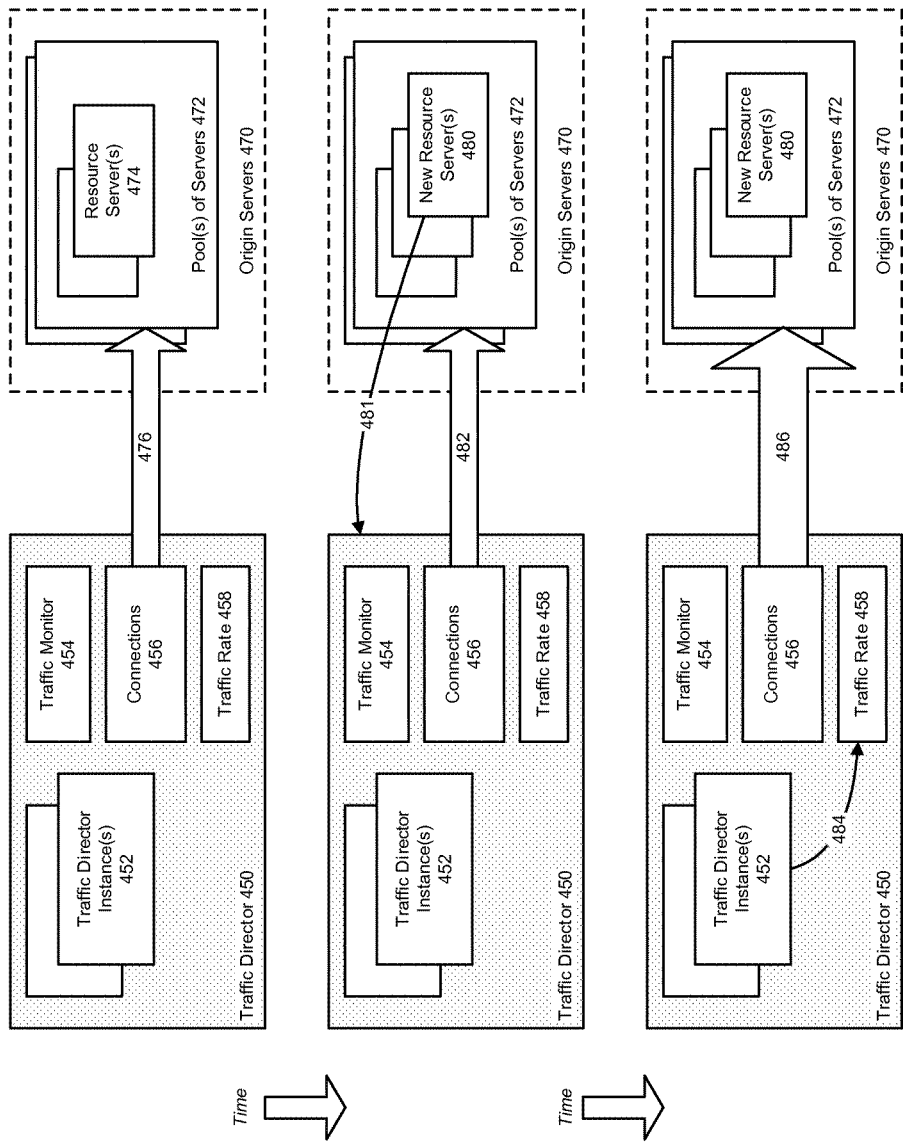
FIG. 6 illustrates the use of rate acceleration in a traffic director, in accordance with an embodiment.

FIG. 6 illustrates the use of rate acceleration in a traffic director, in accordance with an embodiment. As shown in FIG. 6, a traffic director environment is again provided, including a traffic director 450 having one or more traffic director instances 452, and origin servers 470 having one or more pools of servers 472. Each pool of servers can include one or more (existing) resource servers 474. The traffic director again includes a traffic monitor 454, which enables the traffic director to monitor traffic, including the number of connections 456, between the traffic director instances and one or more of the resource servers within the origin servers.

In accordance with an embodiment, the traffic director can set a traffic rate 458 which initially controls the traffic, including the number of connections 476, between the traffic director instances and one or more (existing) resource servers within the origin servers.

Subsequently, if the traffic monitor determines the presence 481 of additional (new) resource servers 480 within the origin servers, to which the traffic director can direct traffic, the traffic monitor can wait for a period of time, in some instances maintaining the traffic at its initial rate, before gradually shaping or adjusting the traffic rate 484 to direct traffic/connections between the traffic director instances and those new resource servers 486.

Request rate shaping (acceleration/deceleration) differs from the surge protection features described earlier—although both mechanisms can be used to limit request traffic, they are based on different criteria; in particular, rate shaping takes limiting actions based on request properties, while surge protection is primarily based on the amount of concurrent connections to origin servers.

In accordance with an embodiment, a time-based method for the connection capacity adjustment, and a configuration parameter called "ramp-up-time" can be used, which specifies how long traffic director takes to ramp the sending rate up to the server's configured capacity:

Adjusted-Connection-Capacity=MAX{(max-
connections*MIN{1, server-up-time/ramp-up-
time}), 1}

When request rate acceleration is enabled, the adjusted capacity instead of the configured hard limit (max connections) can be used by the traffic director to make routing decisions. As described above, if all the servers have reached their adjusted connection capacities, then new requests will be rejected.

In accordance with an embodiment, to configure surge protection and request rate acceleration for use with the traffic director, the elements called "max-connections" and "ramp-up-time" can be can be added in the element <origin-server> in a server.xml file for the desired resource server, parameters and examples of which are provided in Table 1, and Listing 1 respectively.

TABLE 1

| Element | Occurrences | Description | Value |
| --- | --- | --- | --- |
| max-connections | 0 or 1 | The maximum number of concurrent connections to a server. Users must configure max-connections with a positive value, if they want to enable the features Request Rate Accelerating and Surge Protection. If value 0 is specified, the Request Rate Accelerating and Origin Server Surge Protection will be disabled for the server. | 0 or positive integer. The maximum allowable value is 20480 and the default value is 0 (no limit). |
| ramp-up-time | 0 or 1 | The time in seconds that Denali takes to ramp the sending rate up to the capacity of a newly up origin server. If the parameter is not specified, request rate accelerating will not be activated for the server. | Positive integer. |

Listing 1

```
<server>
...
<reverse-proxy>
<server-pool>
<name>serverpool1</name>
<load-distribution>weighted-round-robin</load-distribution>
   <origin-server>
      <host>server1</host>
      <port>80</port>
      <protocol>HTTP</protocol>
      <weight>10</weight>
      <max-connections>50</max-connections>
      <ramp-up-time>600</ramp-up-time>
   </origin-server>
   <origin-server>
      <host>server2</host>
      <port>80</port>
      <protocol>HTTP</protocol>
      <weight>20</weight>
      <max-connections>100</max-connections>
      <ramp-up-time>300</ramp-up-time>
   </origin-server>
</server-pool>
...
</reverse-proxy>
...
</server>
```

Figure 7:
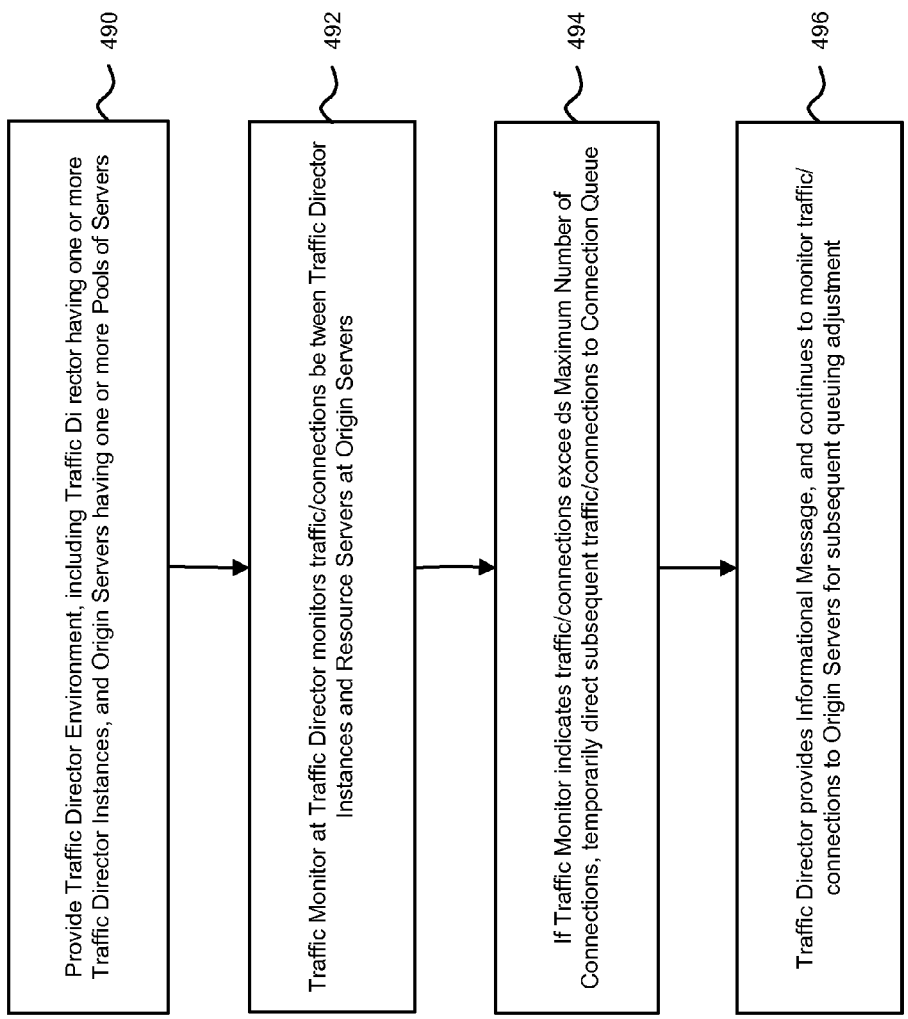
FIG. 7 is a flowchart of a method for providing surge protection in a traffic director, in accordance with an embodiment.

FIG. 7 is a flowchart of a method for providing surge protection in a traffic director, in accordance with an embodiment. As shown in FIG. 7, at step 490, a traffic director environment is provided, including a traffic director having one or more traffic director instances, and origin servers having one or more pools of servers. At step 492, a traffic monitor at the traffic director monitors traffic, including the number of connections, between the traffic director instances and one or more resource servers within the origin servers. At step 494, if the traffic monitor determines that the traffic, including the number of connections, between the traffic director and a particular resource server exceeds a maximum amount allowed for that resource server, then the traffic director will temporarily direct subsequent traffic and connections away from the resource server and to a connection queue. At step 496, the traffic director can optionally provide an informational message, e.g., to a log file or to an administrator to inform of the traffic surge, and will continue to monitor traffic/connections to the origin servers, for subsequent adjustment to the connection queue as necessary.

Figure 8:
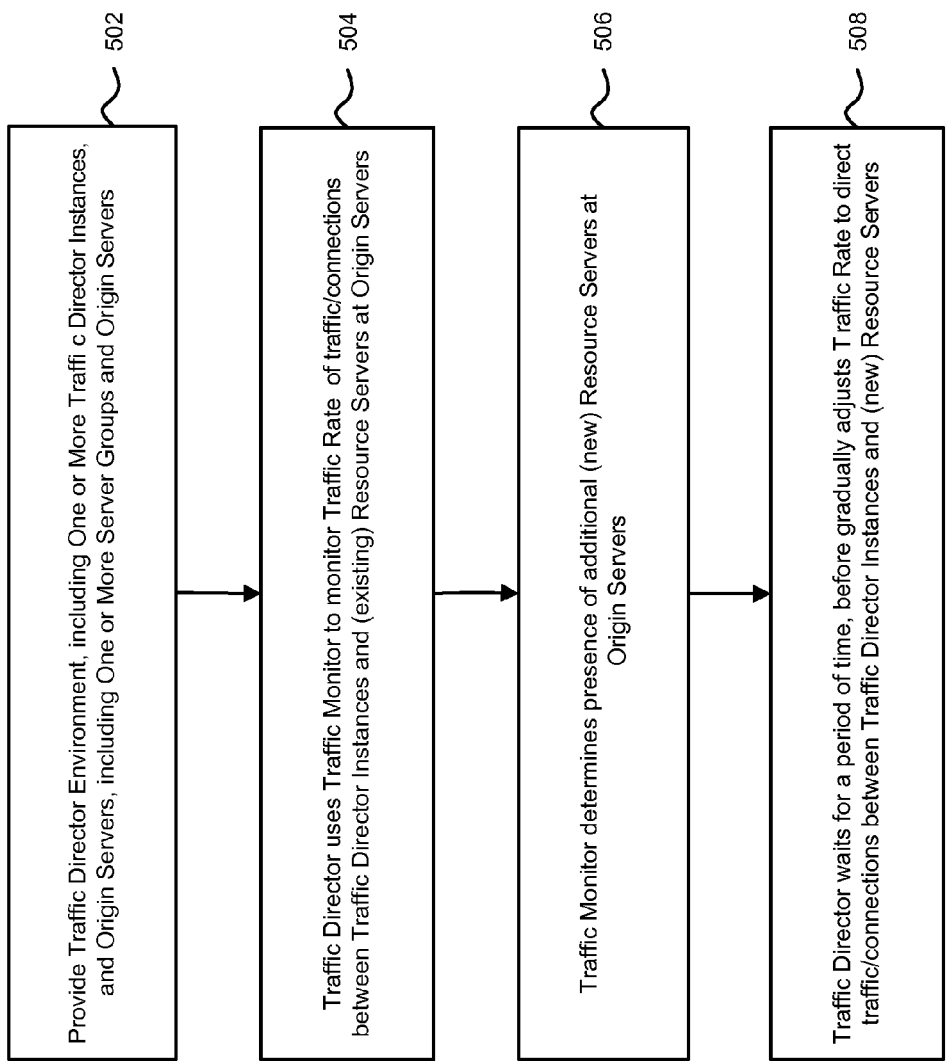
FIG. 8 is a flowchart of a method for providing rate acceleration in a traffic director, in accordance with an embodiment.

FIG. 8 is a flowchart of a method for providing rate acceleration in a traffic director, in accordance with an embodiment. As shown in FIG. 8, at step 502, a traffic director environment is again provided, including a traffic director having one or more traffic director instances, and origin servers having one or more pools of servers. At step 504, using information from a traffic monitor, the traffic director can set a traffic rate which initially controls the traffic, including the number of connections, between the traffic director instances and one or more (existing) resource servers within the origin servers. At step 506, the traffic monitor can determine the presence of additional (new) resource servers within the origin servers, to which the traffic director can direct traffic. At step 508, the traffic director can wait for a period of time, before gradually shaping or adjusting the traffic rate, to direct traffic/connections between the traffic director instances and those new resource servers.

Although not illustrated in FIG. 8, as described above, in accordance with an embodiment a similar technique can be use to monitor and gradually shape or adjust the traffic rate to decelerate traffic to an existing resource server, e.g., so that the server can be taken offline when its traffic is completely quiesced.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in a networked computing environment which includes a traffic director component, comprising:
   a first physical node having a microprocessor and a computer memory; a traffic director operating on the first physical node, and comprising having at least one active traffic director server instance;
   a collection of resource servers, wherein each resource server operates on at least one physical resource node, wherein the at least one physical resource node and the first physical node are separate nodes, and wherein the at least one physical resource node and first physical node are connected via the networked computing environment;
   a configuration which defines an origin-server pool, wherein the defined origin-server pool includes a plurality of resource servers from the collection of resource servers, wherein each of the included plurality of resource servers host the same application or service, and wherein the configuration includes, for each of the included plurality of resource servers, a specified maximum number of network connections and a specified ramp-up time;
   a traffic monitor at the traffic director, which monitors traffic, including a number of current network connections between the at least one active traffic director server instance and each resource server in the defined origin-server pool, wherein the current network connections serve client requests through, and received by, the at least one active traffic director server instance; and
   wherein the traffic monitor is configured to determine the availability of a particular resource server of the plurality of resource servers, the particular resource server being previously unavailable to receive current network connections from the at least one traffic director server instance; and
   wherein the at least one active traffic director server instance is configured to use information provided by the traffic monitor, including the number of current network connections between the at least one active traffic director and the particular resource server, to:
   wait to open new current network connections with the particular resource server until after the passing of a specified delay time:
   after the passing of the specified delay time, gradually increase the number of current network connections to the particular resource server over the ramp-up time that is specified for the particular resource server in the configuration; and
   increase the number of current network connections to the particular resource server up to the maximum number of network connections that is specified for the particular resource server in the configuration, at which point client request traffic is temporarily direct away from the particular resource server and directed to a connection queue.

2. The system of claim 1, wherein the traffic director provides an information message to a log file or to an administrator to inform of a traffic surge beyond the maximum number of network connections that is specified for the particular resource server.

3. The system of claim 1, wherein two or more traffic director instances are provided within a failover group, wherein the at least one active traffic director instance is in the failover group, wherein requests received at the failover group are first routed to the at least one active traffic director instance within the failover group, and if the at least one active traffic director instance is not reachable, then to a backup instance within the failover group.

4. The system of claim 3, wherein the two or more traffic director instances are grouped by a single internet protocol (IP) address.

5. The system of claim 1, wherein the configuration includes, for each of the included plurality of resource servers, a specified ramp-down time.

6. The system of claim 5, wherein, in response to an instruction to decelerate traffic to the particular resource server, the at least one traffic director server instance is configured to gradually decrease the number of connections to the particular resource server over the ramp-down time that is specified for the particular resource server in the configuration.

7. The system of claim 1, wherein, after the passing of the specified delay time, the number of network connections to the particular resource server is gradually increased, over the ramp-up time that is specified for the particular server in the configuration, by a predefined value after a certain number of responses are received from the particular resource server.

8. The system of claim 1, wherein, after the passing of the specified delay time, the number of network connections to the particular resource server is gradually increased by a fixed value per unit time over the ramp-up time that is specified for the particular server in the configuration.

9. A method for use in a networked computing environment which includes a traffic director component, comprising the steps of: providing a traffic director having at least one active traffic director server instance that operates on a microprocessor and a computer memory of a first physical node;
   providing a collection of resource servers, wherein each resource server operates on at least one physical resource node, wherein the at least one physical resource node and the first physical node are separate nodes, and wherein the at least one physical resource node and first physical node are connected via the networked computing environment;

providing a configuration which defines an origin-server pool, wherein the defined origin-server pool includes a plurality of resource servers from the collection of resource servers, wherein each of the included plurality of resource servers host the same application or service, and wherein the configuration includes, for each of the included plurality of resource servers, a specified maximum number of network connections and a specified ramp-up time;

providing a traffic monitor at the traffic director, which monitors traffic, including a number of current network connections between the at least one active traffic director server instance and each resource server in the defined origin-server pool, wherein the current network connections serve client requests through, and received by, the at least one active traffic director server instance;

determining, by the traffic monitor, the availability of a particular resource server of the plurality of resource servers, the particular resource server being previously unavailable to receive current network connections from the at least one traffic director server instance;

using, by the at least one active traffic director server instance, information provided by the traffic monitor, including the number of current network connections between the at least one active traffic director and the particular resource server, to perform the steps of:

waiting to open new current network connections with the particular resource server until after the passing of a specified delay time;

after the passing of the specified delay time, gradually increasing the number of current network connections to the particular resource server over the ramp-up time that is specified for the particular resource server in the configuration; and increasing the number of current network connections to the particular resource server up to the maximum number of network connections that is specified for the particular resource server in the configuration, at which point client request traffic is temporarily direct away from the particular resource server and directed to a connection queue.

10. The method of claim 9, further comprising the steps of:
providing an informational message to a log file or to an administrator to inform of a traffic surge beyond the maximum number of network connections that is specified for the particular resource server.

11. The method of claim 9, further comprising the step of:
providing two or more traffic director instances within a failover group, wherein the at least one active traffic director instance is in the failover group, wherein requests received at the failover group are first routed to the at least one active traffic director instance within the failover group, and if the at least one active traffic director instance is not reachable, then to a backup instance within the failover group.

12. The method of claim 11, further providing the steps of:
grouping the two or more traffic director instances by a single internet protocol (IP) address.

13. The method of claim 9, wherein the configuration includes, for each of the included plurality of resource servers, a specified ramp-down time.

14. The method of claim 13, further comprising the steps of:
Gradually decreasing the number of connections to the particular resource server over the ramp-down time that is specified of the particular resource server in the configuration in response to an instruction to decelerate traffic to the particular resource server.

15. The method of claim 9, wherein, after the passing of the specified delay time, the number of network connections to the particular resource server is gradually increased, over the ramp-up time that is specified for the particular server in the configuration, by a predefined value after a certain number of responses are received from the particular resource server.

16. The method of claim 9, wherein, after the passing of the specified delay time, the number of network connections to the particular resource server is gradually increased by a fixed value per unit time over the ramp-up time that is specified for the particular server in the configuration.

17. A non-transitory computer readable medium, including instructions stored thereon which when read and executed by one or more networked computers in a network computing environment cause the one or more computers to perform the steps comprising:

providing a traffic director having at least one active traffic director server instance that operates on a microprocessor and a computer memory of a first physical node:

providing a collection of resource servers, wherein each resource server operates on at least one physical resource node, wherein the at least one physical resource node and the first physical node are separate nodes, and wherein the at least one physical resource node and first physical node are connected via the networked computing environment:

providing a configuration which defines an origin-server pool, wherein the defined origin-server pool includes a plurality of resource servers from the collection of resource servers, wherein each of the included plurality of resource servers host the same application or service, and wherein the configuration includes, for each of the included plurality of resource servers, a specified maximum number of network connections and a specified ramp-up time;

providing a traffic monitor at the traffic director, which monitors traffic, including a number of current network connections between the at least one active traffic director server instance and each resource server in the defined origin-server pool, wherein the current network connections serve client requests through, and received by, the at least one active traffic director server instance;

determining, by the traffic monitor, the availability of a particular resource server of the plurality of resource servers, the particular resource server being previously unavailable to receive current network connections from the at least one traffic director server instance;

using, by the at least one active traffic director server instance, information provided by the traffic monitor, including the number of current network connections between the at least one active traffic director and the particular resource server, to perform the steps of:

waiting to open new current network connections with the particular resource server until after the passing of a specified delay time;

after the passing of the specified delay time, gradually increasing the number of current network connections to the particular resource server over the ramp-up time that is specified for the particular resource server in the configuration; and increasing the number of current network connections to the particular resource server up to the maximum number of network connections that is specified for the particular resource server in the configuration, at which point client request traffic is temporarily direct away from the particular resource server and directed to a connection queue.

18. The non-transitory computer readable medium of claim 17, wherein the configuration includes, for each of the included plurality of resource servers, a specified ramp-down time; and further including the step of gradually decreasing the number of connections to the particular resource server over the ramp-down time that is specified for the particular resource server in the configuration in response to an instruction to decelerate traffic to the particular resource server.

19. The non-transitory computer readable medium of claim 17, wherein after the passing of the specified delay time, the number of network connections to the particular resource server is gradually increased, over the ramp-up time that is specified for the particular server in the configuration, by a predefined value after a certain number of responses are received from the particular resource server.

20. The non-transitory computer readable medium of claim 17, wherein after the passing of the specified delay time, the number of network connections to the particular resource server is gradually increased by a fixed value per unit time over the ramp-up time that is specified for the particular server in the configuration.

* * * * *

UNITED STATES PATENT AND TRADEMARK OFFICE
CERTIFICATE OF CORRECTION

| | |
|---|---|
| PATENT NO. | : 9,733,983 B2 |
| APPLICATION NO. | : 13/601428 |
| DATED | : August 15, 2017 |
| INVENTOR(S) | : Kukreja et al. |

It is certified that error appears in the above-identified patent and that said Letters Patent is hereby corrected as shown below:

On the Title Page

On page 3, Column 1, under Other Publications, Line 22, delete "Wtih" and insert -- With --, therefor.

In the Drawings

On sheet 3 of 8, in Figure 3, under Reference Numeral 224, Line 1, delete "Instrusion" and insert -- Intrusion --, therefor.

On sheet 7 of 8, in Figure 7, under Reference Numeral 490, Line 1, delete "Di rector" and insert -- Director --, therefor.

On sheet 7 of 8, in Figure 7, under Reference Numeral 492, Line 1, delete "be tween" and insert -- between --, therefor.

On sheet 7 of 8, in Figure 7, under Reference Numeral 494, Line 1, delete "excee ds" and insert -- exceeds --, therefor.

On sheet 8 of 8, in Figure 8, under Reference Numeral 502, Line 1, delete "Traffi c" and insert -- Traffic --, therefor.

On sheet 8 of 8, in Figure 8, under Reference Numeral 508, Line 1, delete "T raffic" and insert -- Traffic --, therefor.

In the Claims

In Column 11, Line 36, in Claim 1, after "comprising" delete "having".

In Column 11, Line 61, in Claim 1, after "instance;" delete "and".

Signed and Sealed this
Nineteenth Day of June, 2018

Andrei Iancu
*Director of the United States Patent and Trademark Office*

CERTIFICATE OF CORRECTION (continued)
U.S. Pat. No. 9,733,983 B2

In Column 12, Line 8, in Claim 1, delete "time:" and insert -- time; --, therefor.

In Column 12, Line 22, in Claim 2, delete "information" and insert -- informational --, therefor.

In Column 14, Line 3, in Claim 14, delete "Gradually" and insert -- gradually --, therefor.

In Column 14, Line 5, in Claim 14, delete "specified of the" and insert -- specified for the --, therefor.

In Column 14, Line 27, in Claim 17, delete "node:" and insert -- node; --, therefor.

In Column 14, Line 34, in Claim 17, delete "environment:" and insert -- environment; --, therefor.